Figure 1:
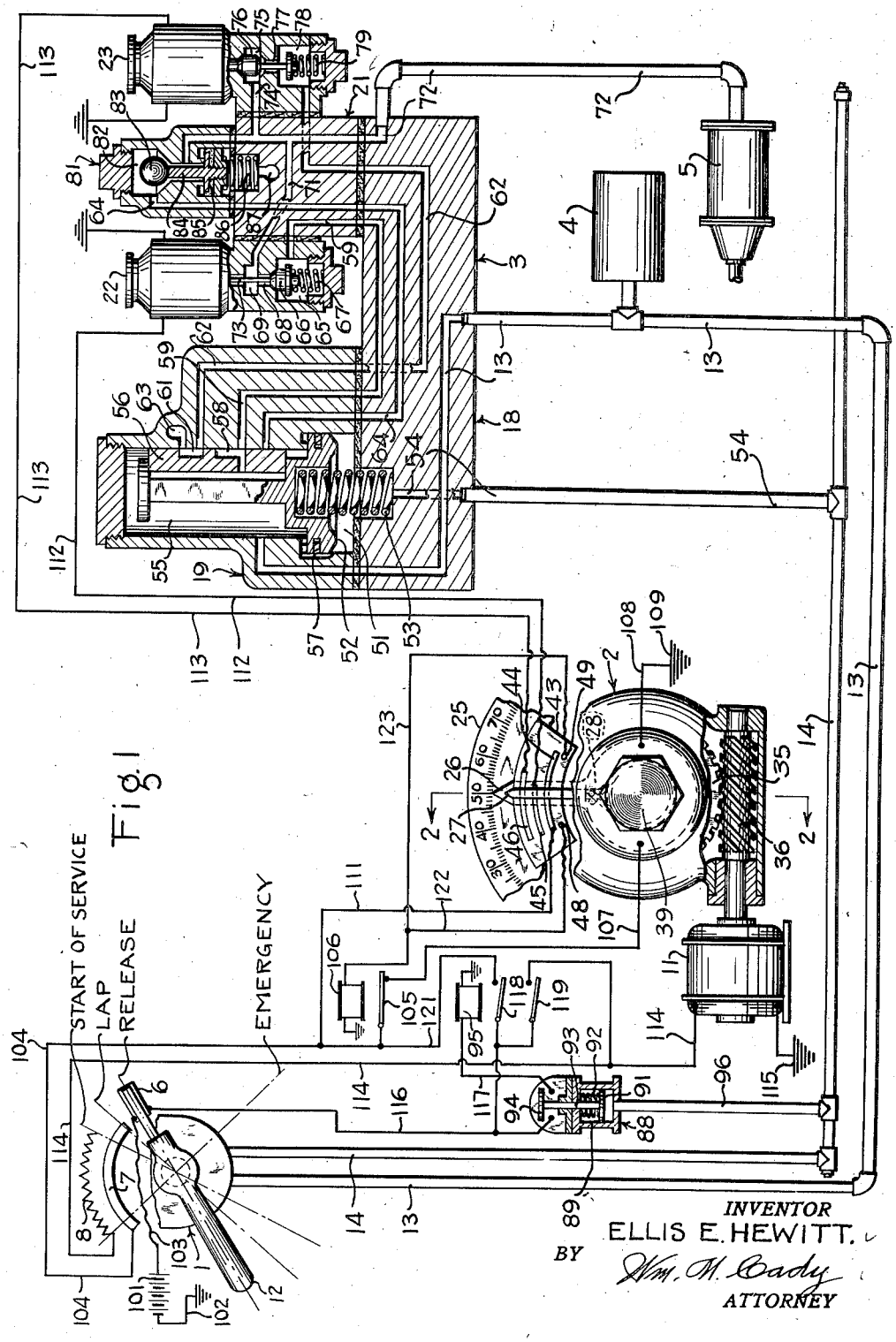

July 27, 1937.  E. E. HEWITT  2,088,169
RETARDATION CONTROLLED BRAKE
Filed May 24, 1934   2 Sheets-Sheet 1

INVENTOR
ELLIS E. HEWITT.
BY
Wm. M. Cady
ATTORNEY

July 27, 1937.　　　　E. E. HEWITT　　　　2,088,169
RETARDATION CONTROLLED BRAKE
Filed May 24, 1934　　　　2 Sheets-Sheet 2

INVENTOR
ELLIS E. HEWITT.
BY Wm. M. Cady
ATTORNEY

Patented July 27, 1937

2,088,169

UNITED STATES PATENT OFFICE 2,088,169

RETARDATION CONTROLLED BRAKE

Ellis E. Hewitt, Edgewood, Pa., assignor to The Westinghouse Air Brake Company, Wilmerding, Pa., a corporation of Pennsylvania Application May 24, 1934, Serial No. 727,291

14 Claims. (Cl. 303—21)

This invention relates to vehicle brakes and particularly to apparatus for automatically controlling the degree of application of the brakes at predetermined values selected by the operator.

In vehicles employing friction type brakes, it is well known that for a given braking pressure such brakes are less effective in retarding the motion of a vehicle at high speeds than at low speeds because of varying coefficient of friction between the wheels and the brake shoes which is lower at high speeds than at low speeds.

In order to bring a vehicle to a stop quickly, employing the maximum permissible brake pressure at all speeds, it has been the usual practice for an operator to apply the brakes with a high degree of braking pressure at high speed, and, as the speed of the vehicle lessens, to decrease the braking pressure gradually in order to provide for a smooth stop without shock or slipping of the wheels.

In accordance with my invention, I employ a motor driven retardation governor cooperating with a speedometer driven from the car axle. Electrical contact members are provided on the speedometer hand and on the retardation governor, and so operated that, should the rate of deceleration exceed the rate set by the retardation governor, the brakes will be released. My invention also insures against dead slipping of the wheel while making a stop by providing means for automatically releasing the brake should the rate of retardation of the car axle exceed the deceleration of the retardation governor.

It is an object of my invention to provide an electropneumatic brake equipment for trolley cars or trains in which the operator is permitted to select any desired rate of retardation from zero miles per hour per second to the maximum rate which is just below that required to slip the wheels on the rails, and the rate of retardation will be automatically maintained until the stop is completed.

It is another object of my invention to protect each wheel axle of the car or train against slippage independently of each other axle.

It is a further object of my invention to provide for maintaining a maximum rate of brake application throughout the train in the event of an emergency brake application.

A still further object of my invention is to provide, in the event of failure of the electrical equipment, for maintaining a uniform brake cylinder pressure, upon the setting of an emergency valve.

Figure 2:
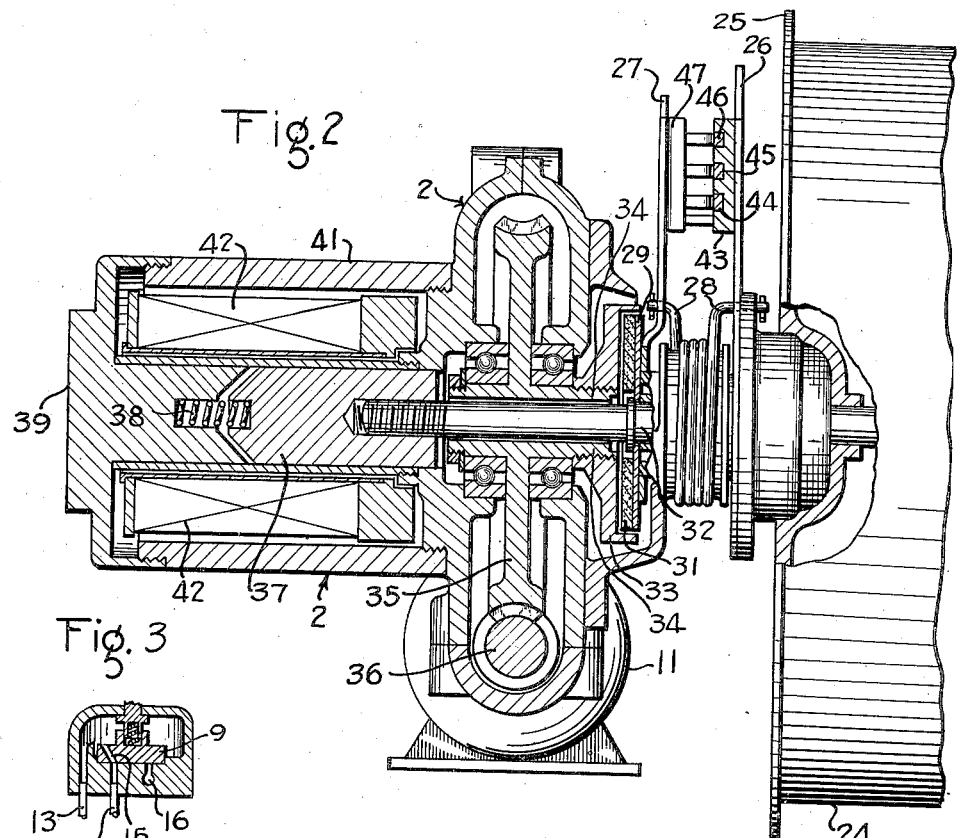
Figure 3:
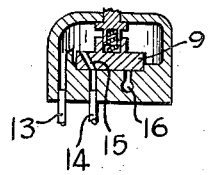
Figure 4:
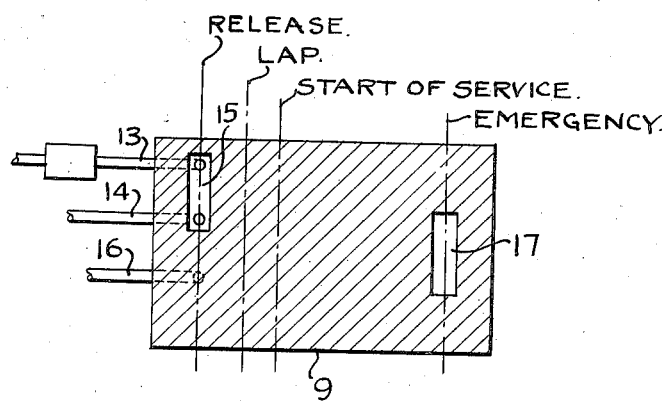

Other objects and advantages of my invention will be apparent from the following description of a preferred embodiment thereof, reference being had to the accompanying drawings, in which:

Fig. 1 is a diagrammatic view of apparatus and circuits comprising one preferred embodiment of my invention, Fig. 2 is a sectional view taken along the line 2—2 of Fig. 1, Fig. 3 is a diagrammatic view of the brake valve, and Fig. 4 is a development of the valve surface illustrating the several valve positions.

Referring to the drawings, and particularly to Fig. 1 thereof, a brake valve or master controller 1 is provided, and controls the operation of a retardation controller 2 that governs the operation of a brake control valve 3 to permit fluid under pressure to flow from the reservoir 4 to the brake cylinder 5 to apply the brake, and from the brake cylinder 5 to the atmosphere to release the brake.

The brake valve or master controller 1 comprises an electric switch, including contact members 6 and 7 for controlling the energization of a clutch on the retardation controller 2, a rheostat 8 for controlling the rate of operation of a motor 11 for driving the retardation controller, and a rotary valve 9 all operated by one brake controlling handle 12. The rotary valve 9 serves to connect the reservoir pipe 13 with the brake pipe 14 through the valve port 15 to maintain pressure in the brake pipe, and, when placed in an emergency position, to connect the brake pipe 14 to the exhaust port 16, through port 17 in the rotary valve, to make an emergency brake application independently of application of the brake as controlled by the retardation controller 2. This emergency operation of the brake can also be employed in the event of failure of the retardation controller to operate for any reason, such as might result from failure of one of the electric circuits.

The control valve 3 comprises a pipe bracket portion 18, an emergency valve portion 19, and a magnet valve portion 21, the latter of which includes an application magnet valve device 22 and a release magnet valve device 23 for controlling the connection from the brake cylinder 5 to the reservoir 4, and to the atmosphere.

The speed indicator and retardation controller comprises an axle driven speedometer 24, provided with a dial 25 and with a speed indicating hand 26 that is moved in accordance with changes in the speed of the vehicle with sufficient force to operate contacts carried thereon. A controlling hand 27, or pilot indicator, is also provided that is normally held in the same position as the hand 26 by means of a spring 28. The hand 27 is fixedly attached to rotate with a disc 29 and a clutch plate 31 about a shaft 32, and is mounted to be axially movable to permit engagement of the clutch plate 31 with a clutch plate 33 that is supported upon a sleeve 34, formed integrally with a gear wheel 35 that engages a worm 36 driven by the motor 11. The left hand end of the shaft 32, as viewed in Fig. 2, is attached to a movable core 37 of magnetic material that is normally biased by a spring 38 from a core member 39 that is mounted on the casing 41, and is adapted to be moved toward the left upon energization of the coil 42. Upon movement of the brake handle 12 in a counterclockwise direction a sufficient amount to cause engagement of the contact members 6 and 7 the coil 42 of the clutch mechanism is energized, causing movement of the shaft 32 towards the left to effect engagement of the clutch plates 31 and 33, causing the clutch to seize the hand 27, and, upon further movement of the handle 12 in a counterclockwise direction to effect engagement of the contact member 6 to complete a circuit through the resistor of rheostat 8, the motor 11 is operated at a rate of speed determined by the position of the handle 12 in a direction to move the pilot indicator hand 27 toward zero speed on the indicator dial.

A contact supporting plate 43 is carried by the speedometer arm 26, upon which is mounted contact members 44, 45 and 46 that are adapted to be bridged by a contact member 47 carried upon the controller hand 27. Limit contact members 48 and 49 are also carried on the supporting plate 43 for limiting the travel of the hand 27 with respect to the hand 26 in a manner to be later described.

The emergency valve portion 19 of the control valve 3 encloses a cylindrical chamber 51 in which an emergency piston 52 travels, and is urged upwardly by a spring 53. Brake pipe pressure is applied to the face of the piston 52 through the pipe and port 54. A valve chamber 55 is provided above the chamber 51 and contains an emergency slide valve 56 that is actuated by the piston 52. The valve chamber 55 is in communication with the chamber 51 through a groove 57 in the upper wall of the chamber when the piston is in its upper or illustrated position. The valve chamber 55 is in continuous open communication with the reservoir 4 through pipe and port 13. Reservoir pressure will therefore be maintained in the brake pipe by the supply of air through the groove 57 and port and pipe 54 starts maintaining an equalization of pressure on the opposite face of the piston 52.

In the illustrated or release position of the slide valve 56 the groove and port 58 in the valve effects communication between the valve chamber 55 and the inlet port 59 to the application magnet valve 22. A groove 61 in the slide valve 56 effects communication between the outlet port 62, leading from the release magnet valve 23, and the exhaust port 63, and the port 64 is closed by the slide valve to prevent loss of brake pipe pressure.

In the application magnet valve device 22 a valve chamber 65 is provided that is in communication with the inlet port 59 and in which a valve 66 is positioned and normally biased by a spring 67 to its seat to close a passage through a port 68 leading from the valve chamber 65 to an outlet chamber 69, that is in communication through port 71 with port and pipe 72. A valve stem 73 extends upwardly from the valve 66 and is adapted to be actuated downwardly by the operating magnet of the application valve device 22.

An inlet port 74 communicates from the brake cylinder pipe 72 to a valve chamber 75 in the release magnet valve device 23. A valve 76 in the valve chamber 75 is adapted to close port 77 between the valve chamber 75 and an outlet chamber 78 that is in communication with the outlet port 62. The valve 76 is normally biased to its upper or unseated position by a spring 79, and is actuated to its lower or seated position upon energization of the operating magnet of the release magnet valve device 23.

The magnet valve portion of the brake control valve also includes an inshot valve 81, the casing structure of which defines a valve chamber 82 which encloses a ball valve 83 supported on a stem 84 that is carried by a piston 85 in a cylinder below the valve chamber 82. The piston 85 is biased upwardly by a spring 86 to maintain the ball valve 83 in an unseated position. The lower side of the piston 85 is in communication with the atmosphere through outlet port 87.

In order to provide protection against depletion of pressure in the air system to a dangerously low point, a pneumatic switch 88 is provided for causing an emergency operation of the brake when the brake pipe pressure is reduced to a predetermined danger point. This insures that the pressure in the system cannot be reduced through leakage or otherwise to such value that the effectiveness of the brake will be seriously impaired. The pneumatic switch 88 comprises a casing 89 enclosing a cylinder chamber containing a piston 91 that is biased by a spring 92 toward its lower position. A stem 93 extends upwardly from the piston 91 carrying a contact member 94 that, when urged to its upper position, is held in its circuit interrupting position thus maintaining the emergency relay 95 in its deenergized position. The lower part of the cylinder chamber is connected by a pipe 96 to the brake pipe 14, thus supplying brake pipe pressure to the lower face of the piston 91 which is biased against the pressure of the spring 92 to maintain the switch in its open position when the brake pipe pressure is above the predetermined low value.

With the brake valve handle in release position, as illustrated in Fig. 1, brake pipe pressure is maintained through the rotary valve port 15, as illustrated in Figs. 3 and 4. With this position of the brake valve handle the emergency piston 52 will be in its illustrated position and brake pipe pressure will also be maintained through the groove 57 in the wall of the emergency piston bush.

With the brake valve handle in lap position, the supply of air to maintain the brake pipe pressure through the rotary valve is cut off and brake pipe pressure is maintained only through the feed groove 57 in the emergency piston bush. In this position of the brake valve handle a circuit is closed for energizing the clutch coil of the retardation controller. This circuit extends from the battery 101, one terminal of which is grounded at 102, through conductor 103, contact members 6 and 7 of the valve control switch, through conductor 104, contact member 105 of the limit relay 106 in its deenergized position, conductor 107, coil 42 of the clutch mechanism, conductor 108, to ground at 109.

In lap position of the brake valve handle the circuit through the rheostat 8 to the motor 11 is not completed, so that the retardation control hand 27 will be held in the position indicating the speed at which the speedometer was registering at the time the brake handle was moved to lap position. A circuit is completed causing the brakes to be applied to reduce the train speed slightly to cause the speedometer to interrupt the circuits to the magnet valves. This circuit extends from the battery 101, through conductor 103, contact members 6 and 7, conductors 104, 111 to the contact segment 44 on the retardation controller, which is connected through contact member 47 carried by the arm 27 to the segments 45 and 46 of the retardation controller. A circuit is completed from the contact segment 45, by conductor 112 through the coil of the application magnet valve device 22 causing it to be operated downwardly. A circuit is also completed from the contact segment 46 through conductor 113, and the coil of the release magnet valve device 23 to ground, causing the magnet valve 76 to be operated downwardly to prevent the escape of air from the brake cylinder 5. This operation of the application magnet valve device 22 permits air under pressure to be supplied from the reservoir 4 through pipe and port 13 to the valve chamber 55, through port 58 in the valve 56, port 59 in the valve seat to the application valve chamber 65, through port 68, chamber 69, port 71, and port and pipe 72 to the brake cylinder 5.

This operation of the brake will cause only slight retardation of the vehicle, or enough to cause the speedometer to interrupt the circuit to the application valve 22 and the release valve 23. Upon retardation of the speed of the vehicle, the speedometer hand 26 will move in a counterclockwise direction, as viewed in Fig. 1, carrying the contact segments 44, 45 and 46 with it. A slight movement only of the contact segments is required to cause interruption of the circuit through the contact segment 45 energizing the winding of the application magnet valve device 22 and permitting it to be again actuated by the spring 67 to its closed or illustrated position. Further increase in the application of the brakes is thus interrupted and upon a further slight movement of the hand 26 in a counterclockwise direction, the circuit through the contact segment 46 is interrupted, thus deenergizing the coil of the release magnet valve device 23 and permitting it to be actuated upwardly or to its open position. When so actuated, brake cylinder air is released through pipe and port 72, port 74, release magnet valve chamber 75, port 77, chamber 78, port 62, and groove 61 in the slide valve 56, to exhaust port 63, and to the atmosphere. Should the train speed increase for any reason, the brakes would again be applied sufficiently to limit the train speed to that value at which it was traveling at the time the coil 42 of the retardation controller became energized.

If the brake valve handle is now moved to its third or service position, the circuits above described, extending through the contact segment 7, are maintained alive and a circuit is completed through the rheostat 8, conductor 114, the winding of the motor 11, and the ground at 115, to operate the motor 11 at a speed determined by the amount of resistance 8 that is maintained in the circuit. The motor 11 drives the worm 36 that is in engagement with the gear wheel 35 and operates the pilot indicator hand 27 in a counterclockwise direction toward its zero-speed position. Upon movement of the hand 27, the above traced circuit is closed through contact segments 44 and 46 to operate the release magnet valve 23 to its closed position, and upon a slight further travel of the hand 27, a circuit is completed through the contact segments 44 and 45, as above traced, to cause operation of the application magnet valve 22 to its open position to effect application of the brakes.

Upon application of the brakes the speedometer hand 26 will move toward its zero position, its rate of movement being determined by the rate of deceleration of the train. Should the hand 26 move at a faster rate than the hand 27 is moved by the motor 11, the brakes will be released upon interruption of the circuits to the windings of the application magnet valve 22 and the release magnet valve 23, and again reapplied as the hand 27 advances to a position where the contact member 47 will again complete the circuits between the contact segment 44 and the contact segments 45 and 46 to again energize the valves 22 and 23. The rate of retardation of the train speed is therefore dependent upon the rate of movement of the pilot indicator 27 toward its zero position, which is determined by the rate of operation of the motor 11 as determined by the position of the controller handle 12.

Upon operation of the brake valve handle to its emergency position, the resistance of the rheostat 8 will be entirely eliminated from the circuit through the motor 11, causing the motor to operate at its maximum speed and correspondingly operate the magnet valves 22 and 23 to effect a heavy application of the brakes. At the same time air is vented from the brake pipe 14 through the port 17 in the rotary valve to the exhaust port 16 and to the atmosphere. This venting of pressure from the brake pipe 14 relieves the pressure below the piston 52 of the emergency valve at a rate more rapid than it can be supplied through the groove 57, so that the differential pressures on the piston 52 become sufficient to force the piston down against the pressure of the spring 53. When the emergency valve 56 is moved to its lower position, the passage from port 62 through groove 61 and exhaust port 63 is interrupted and the port and groove 58 in its lower position connects the valve chamber 55 to both the inlet passage 59, leading to the application valve chamber 65, and also to the port 64, leading to the inshot valve chamber 82. Air under pressure will therefore pass from the valve chamber 55 through port 64, valve chamber 82, past the ball check valve 83, through port and pipe 72 to the brake cylinder 5 in addition to the passage of air through the application valve 22. This effects a very rapid rate of application of the brakes so long as the pressure of the air supplied to the inshot valve is below that value necessary to move the piston 85 downwardly against the pressure of the spring 86, thus permitting the check valve 83 to seat and interrupt the flow of air through the port 64. Further application of the brakes will continue through the application magnet valve device until the pressure within the brake cylinder 5 is equal to that within the reservoir 4.

If the electrical circuits for operating the application magnet valve 22 and the release magnet valve 23 for any reason become defective, the operator can stop the train by throwing the brake valve handle to emergency position, thus effecting application of the brakes through operations of the emergency piston 52, the emergency valve 56, and the inshot valve 81, as above described. In this case the application magnet valve 22 remains closed and fluid under pressure is supplied to the brake cylinder solely through the inshot valve 81. A uniform brake cylinder pressure is therefore maintained at a value depending upon the setting of the inshot valve.

A similar emergency brake application will be effected from loose brake pipe connections such as might result from a parted train. In this case the pneumatic switch 88 would be actuated to its closed position, thus completing the circuit from the battery 101, through conductors 103, 116, switch contact member 94, conductor 117 to the coil of the emergency relay 95 and to ground. Upon completion of this circuit, the emergency relay contact members 118 and 119 are actuated to their upper or circuit closing positions, the contact member 118 closing a circuit through conductor 121, contact member 105 of the limit relay 106, conductor 107, and coil 42 of the clutch mechanism. The clutch coil 42 thus energized causes movement of the clutch plate 31 into engagement with the clutch plate 33 to grip the retardation control hand or pilot indicator 27 firmly to the control gear 35 driven by the variable speed motor 11. The contact member 119 closes a circuit from the conductor 116 through conductor 114 to operate the motor 11 at a maximum rate of speed.

In order to prevent losing control of the brakes through too great a separation of the hands 27 and 26 a limit relay 106 is provided for limiting the degree of separation permissible. Should the hand 27 move sufficiently to the left to cause bridging of contact member 48 and the contact segment 44 by the contact member 47 a circuit will be completed through conductor 122 and the winding of limit relay 106 to ground, causing operation thereof to move the contact member 105 upwardly, thus interrupting the circuit through the coil 42 of the clutch mechanism to release the clutch. Upon release of the clutch, the spring 28 immediately moves the arm 27 into a position corresponding to that of the arm 26 to again establish contact between the segments 44, 45 and 46. Similarly, should the arm 27 move toward the right of the arm 26 sufficiently to cause a circuit to be closed from the segment 44 through the contact member 49, this circuit will be completed through conductor 123 and the winding of the limit relay 106 to interrupt the circuit to the clutch mechanism thus again moving the arm 27 into a position corresponding to that of the arm 26.

While I have illustrated and described one preferred embodiment of my invention, many modifications will occur to those skilled in the art within the spirit of my invention and I do not wish to be limited otherwise than by the scope of the appended claims.

Having now described my invention, what I claim as new and desire to secure by Letters Patent, is:

1. In a brake equipment for vehicles, in combination, braking means, a retardation rate selector, a speedometer responsive to the speed of the vehicle, and means for controlling the application of the brake in accordance with variations of the speedometer from the retardation selector.

2. In a brake equipment for vehicles, in combination, braking means, means representative of a permissible vehicle speed, means representative of the actual speed of the vehicle, and means responsive to the differential relation existing between said two last named means for controlling the degree of application of said braking means.

3. In a brake equipment for vehicles, in combination, braking means, dual speed indicators, means for normally actuating said indicators in accordance with speed of said vehicle, means for actuating one of these indicators at a selected rate of speed, and means responsive to variations in the positions of said indicators for controlling the application of said brake.

4. In a brake equipment for vehicles, in combination, braking means, a speed indicator responsive to the speed of the vehicle, a pilot indicator normally actuated in accordance with the operation of said speed indicator, means for actuating said pilot indicator at a selected rate of speed, and means for controlling the application of said braking means in accordance with variations between the pilot indicator and the speed indicator to effect a predetermined rate of deceleration of said vehicle determined by said pilot indicator.

5. In a brake equipment for vehicles, in combination, braking means, a speed indicator responsive to the speed of the vehicle, a pilot indicator normally actuated in accordance with the operation of said speed indicator, means for operating said pilot indicator at a selected rate of speed corresponding to a desired rate of deceleration of said vehicle, and means comprising electrical circuits controlled in accordance with variations between the pilot indicator and the speed indicator for controlling the application of said braking means.

6. In a brake equipment for vehicles, in combination, braking means, a speed indicator responsive to the speed of the vehicle, a pilot indicator, means for biasing said pilot indicator in accordance with the operation of said speed indicator, means for actuating said pilot indicator in accordance with a desired decrease in the speed of the vehicle, electroresponsive means for controlling the application of said braking means, and control means operable upon a relative movement between said pilot indicator and said speed indicator for controlling said electroresponsive means.

7. In a brake equipment for vehicles, in combination, braking means, a speed indicator responsive to the speed of the vehicle, a pilot indicator, means for biasing said pilot indicator in accordance with the operation of said speed indicator, means for actuating said pilot indicator in accordance with a desired decrease in the speed of the vehicle, electroresponsive valves for controlling the application and release of said braking means, and cooperating electrical contact members actuated in accordance with the variations in the relative positions of said pilot indicator and said speed indicator for controlling the operation of said electroresponsive valves.

8. In a brake equipment for vehicles, in combination, braking means, a speed indicator responsive to the speed of the vehicle, a pilot indicator, means for biasing said pilot indicator in accordance with the operation of said speed indicator, motive means for actuating said pilot indicator in accordance with a desired decrease in the speed of the vehicle, a master controller for effecting an operative connection between said motive means and said pilot indicator and for selecting a desired rate of operation for said motive means, and means responsive to a relative movement between said pilot indicator and said speed indicator for controlling the application of the brakes.

9. In a brake equipment for vehicles, in combination, braking means, a speed indicator responsive to the speed of the vehicle, a pilot indicator, means for biasing said pilot indicator in accordance with the operation of said speed indicator, motive means for actuating said pilot indicator in accordance with a desired decrease in the speed of the vehicle, a clutch for effecting an operative connection between said motive means and said pilot indicator, a master controller for operating the clutch and for selecting a desired rate of operation for said motive means, and cooperating electrical contact members actuated by said pilot indicator and said speed indicator for controlling the operation of said braking means.

10. In a brake equipment for vehicles, in combination, braking means, a speed indicator responsive to the speed of the vehicle, a pilot indicator, means for biasing said pilot indicator in accordance with the operation of said speed indicator, means for actuating said pilot indicator in accordance with a desired decrease in the speed of the vehicle, electroresponsive valves for controlling the application and release of said braking means, cooperating electrical contact members actuated in accordance with variations in the relative positions of said pilot indicator and said speed indicator for controlling the operation of said electroresponsive valves, an emergency triple valve for controlling the operation of said braking means, and a master controller for selecting the desired rate of operation of said pilot indicator and effective, when in an emergency position, to cause a maximum rate of operation of said pilot indicator and operation of said triple valve to a brake applying position.

11. In a brake equipment for vehicles, in combination, braking means, a speed indicator responsive to the speed of the vehicle, a pilot indicator, means for biasing said pilot indicator in accordance with the operation of said speed indicator, means for actuating said pilot indicator in accordance with a desired decrease in the speed of the vehicle, electroresponsive means for controlling the application of said braking means, control means operable upon a relative movement between said pilot indicator and said speed indicator for controlling said electroresponsive means, and a pneumatic switch responsive to a predetermined minimum pressure of brake pipe pressure for effecting an emergency operation of said electroresponsive means.

12. In a brake equipment for vehicles, in combination, braking means, a speed indicator responsive to the speed of the vehicle, a pilot indicator, means for biasing said pilot indicator in accordance with the operation of said speed indicator, means for actuating said pilot indicator in accordance with a desired decrease in the speed of the vehicle, electroresponsive valves for controlling the application and release of said braking means, cooperating electrical contact members actuated in accordance with variations in the relative positions of said pilot indicator and said speed indicator for controlling the operation of said electroresponsive valves, and a pneumatic switch responsive to a predetermined minimum of brake pipe pressure for effecting an emergency operation of said electroresponsive means.

13. In a brake equipment for vehicles, in combination, braking means, a speed indicator responsive to the speed of the vehicle, a pilot indicator, means for biasing said pilot indicator in accordance with the operation of said speed indicator, means for actuating said pilot indicator in accordance with a desired decrease in the speed of the vehicle, electroresponsive means for controlling the application of said brake, and control means operable upon a relative movement between said pilot indicator and said speed indicator for controlling said electroresponsive means, an emergency triple valve for controlling the operation of said braking means upon a decrease in brake pipe pressure, and separate means responsive to a decrease in brake pipe pressure to a predetermined value for effecting rapid operation of said pilot indicator in a brake applying direction.

14. In a brake equipment for vehicles, in combination, braking means, a speed indicator responsive to the speed of the vehicle, a pilot indicator, means for biasing said pilot indicator in accordance with the operation of said speed indicator, motive means for actuating said pilot indicator in accordance with a desired decrease in the speed of the vehicle, a clutch for effecting an operative connection between said motive means and said pilot indicator, a master controller for operating the clutch and for selecting a desired rate of operation of said motive means, cooperating electrical contact members carried by said pilot indicator and said speed indicator for controlling the operation of said braking means, and means operable upon a predetermined separation between said pilot indicator and said speed indicator for temporarily releasing said clutch to permit said pilot indicator to return to the position of said speed indicator.

ELLIS E. HEWITT.